United States Patent [19]
Henrich et al.

[11] 3,820,110
[45] June 25, 1974

[54] EDDY CURRENT TYPE DIGITAL ENCODER AND POSITION REFERENCE

[76] Inventors: Charles T. Henrich, 7 High St., Huntington, N.Y. 11743; John M. Pierce, 3332 Middlefield Rd., Palo Alto, Calif. 94306

[22] Filed: Mar. 22, 1973

[21] Appl. No.: 343,770

[52] U.S. Cl. ........................ 340/347 P, 235/61.11 D
[51] Int. Cl. ........................ G08c 9/08
[58] Field of Search... 340/347 P, 347 DD, 347 AD, 340/174 EC, 174.1 H; 235/61.11 D, 61.12 M; 179/100.2 CH

[56] References Cited

UNITED STATES PATENTS 3,165,731 1/1965 Spaulding ........................ 340/347 P
3,171,104 2/1965 Norton et al. ........................ 340/347 P
3,619,570 11/1971 Grosbard ........................ 235/61.11 D
3,626,160 12/1971 Hagopian ........................ 235/61.11 D

*Primary Examiner*—Joseph F. Ruggiero
*Attorney, Agent, or Firm*—A. Yates Dowell, Jr.

[57] ABSTRACT

A position indicating apparatus in the form of an absolute digital encoder with fixed and movable parts. One of the parts has coded position reference information thereon and the other part has a sensor including a plurality of variable reluctance transducer elements for sensing the position reference information and indicating the position of the sensor relative to a known, fixed position on the reference. The reference may be linear, circular, or cylindrical to conform to the need for measuring linear and/or angular displacement.

11 Claims, 29 Drawing Figures

PATENTED JUN 25 1974 3,820,110

SHEET 5 OF 6

EDDY CURRENT TYPE DIGITAL ENCODER AND POSITION REFERENCE

CROSS-REFERENCE TO RELATED APPLICATION

This application is an improvement over copending U.S. Pat. application Ser. No. 206,690 filed Dec. 10, 1971.

BACKGROUND OF THE INVENTION

1. Field of the Invention

This invention relates generally to apparatus for measuring distances and relates particularly to apparatus for indicating the position of a movable member relative to a fixed member within close tolerances.

2. Description of the Prior Art

Heretofore the problem of sensing the position of one element relative to another has been fundamental to the control of many types of devices, such as machine tools, plotters, automated assembly equipment, and the like. Frequently the design of the entire machine is made more complex by the problems resulting from the difficulty of accurately sensing and indicating the position of one element relative to a starting point or known reference point of another element. Most of the common approaches to the problem have been dependent upon the counting of turns of a rotating member whose rotation is related in some fixed manner to the movement or position to be measured. In linear motion, the problem of relating linear movement to shaft rotation in a constant manner is particularly severe. Lead screws with the smallest amount of error in diametral pitch and lead angle are expensive and the errors are merely reduced, not eliminated.

In some cases, rack and pinion sets are used to measure position; however, these sets are subject to errors in tooth form on both members, errors in spacing from tooth to tooth, errors due to mesh play or backlash, errors in radial play, concentricity errors on the pinion, center distance errors in the assembly, and the like. All of the above types of devices are subject to loss of accuracy due to wear.

The devices used to sense or indicate the position of a rotating member relative to a fixed member also have had potential error sources since they normally tend to be large in size and constant accuracy over the full range of operation has not been readily achieved.

Many of the modern control systems process information in digital form. Devices which generate position information in the form of an analogue signal, such as a varying voltage or varying frequency, must be supplemented by analogue to digital and digital to analogue conversion apparatus which increases cost, complexity and error sources in the system. Some examples of devices of this type are the U.S. Pat. to Bowen No. 2,947,929 and Farrand No. 3,340,451.

A number of systems or devices are presented as digital in nature because they operate on a principle based on counting repetitive events, such as the passage of regularly spaced elements past a fixed sensor, counting peaks in a cyclic phenomena such as a sine wave or the like, or counting of interference fringes through the use of gratings or moire patterns. Examples of this type of device are the U.S. Pat. to Rhoades No. 3,010,063, Marantette No. 3,059,236, and Uemura No. 3,308,449. These devices have the disadvantage that any accidental interruption of the count destroys the validity of the output and requires a reset, as well as some means for detecting that the accident has occurred.

Some systems operate on faith in that they have no built-in means for detecting errors. A significant hazard to such a system is momentary power loss or dropout, and such momentary power losses occur in all practical power systems from time to time. Counting systems can be designed to be insensitive to power dropouts of a few milliseconds, but every such system has a limit to the size of power dropout which it can survive without incurring an error in the output data. Most counting systems also are sensitive to electrical noise involving momentary voltage peaks which may appear to the system as extra pulses.

Another major class of encoders is based on coded tracks. Most of these are rotary in nature with the tracks or channels of coded data being arranged on a disk. Some linear encoders have been devised in which the scale is a pattern of opaque and transparent regions on a transparent plate and the sensor is photo optical. These devices tend to be fragile and large in size. Other types of encoders include contact types or commutator devices in which the coded pattern is a collection of conductive regions sensed by electrically conductive fingers. An example of a magnetic type of linear encoder is the U.S. Pat. to Rowe No. 3,482,316. This system includes the inherent possibility of loss of count due to a momentary power interruption and when power is restored the display number may be invalid unless some action is taken to correct the error.

In copending U.S. Pat. application Ser. No. 206,690, a coded scale having magnetized bits arranged in a predetermined pattern was provided and a read head having a plurality of sensors with Hall generators, magnistors, magneto-resistors or the like were provided for sensing the magnetized bits of information on the scale. This system is satisfactory; however, it is necessary that the bits be magnetized before the read head can sense the bits.

SUMMARY OF THE INVENTION

The present invention is an eddy current type digital encoder and position reference having relatively movable elements in which one element bears absolute position reference information in the form of a predetermined coded pattern and another element includes a pattern sensing device connected to a display for indicating the exact position of one element relative to the other. The coder pattern is passive in the sense that no magnetization is required. Such pattern includes sharply defined regions or bits of high permeability material in a field of low permeability material. The low permeability material includes materials having a wide range of conductivity from a highly conductive material to a non-conductive material.

The sensing device is a position sensing head incorporating one or more inductive coils and a core of highly permeable material which is formed to create a very small carefully defined gap and such gap may be filled with a highly conductive material having low permeability. Additional shield members of low permeability material are provided to confine the magnetic fields created by the inductive coils to a carefully defined region in the vicinity of the gap. Changes in circuit inductance due to changes in the magnetic properties of the gap are sensed and amplified by appropriate electronic devices. Such changes are induced by changing the material located adjacent to the gap from a high permeability material to a low permeability material which may be highly conductive or non-conductive.

A sensing or pickup head incorporating a multiplicity of sensing devices is used in conjunction with a multichannel coded scale to create a position sensing system or absolute encoder. Precise alignment of the sensing head gaps is accomplished by creating a straight, common, sharply defined edge across all of the gaps in the head assembly as one of the manufacturing steps.

The sensing head cooperates with the coded pattern to provide a specific and unique output for each position of one element relative to the other in such a manner that the effects of power dropouts and noise peaks are minimized, and when such effects become sufficiently severe to create a momentary lapse, the system will return to a correct readout value as soon as the disturbance has passed. The sensing head is connected electrically to a conventional binary display device and the system is arranged in such a manner that the position of the sensing head relative to a known reference point on the coded scale will be displayed at all times regardless of whether the elements are stationary relative to each other or one element is moving relative to the other.

It is an object of the invention to provide a position sensing apparatus which is highly accurate, comparatively inexpensive, and provides a direct unambiguous output that is different for each position of a sensing element relative to a coded scale, thereby making the output independent of the prior position or prior history of positions.

Another object of the invention is to provide a position sensing apparatus having an output in digital form which is directly compatible with existing data processing and display devices and which will not be degraded in accuracy of performance due to wear of mating parts, as well as being insensitive to disturbance from the surrounding environment.

DESCRIPTION OF THE PREFERRED EMBODIMENT

Figures 1, 2, 3, 29:
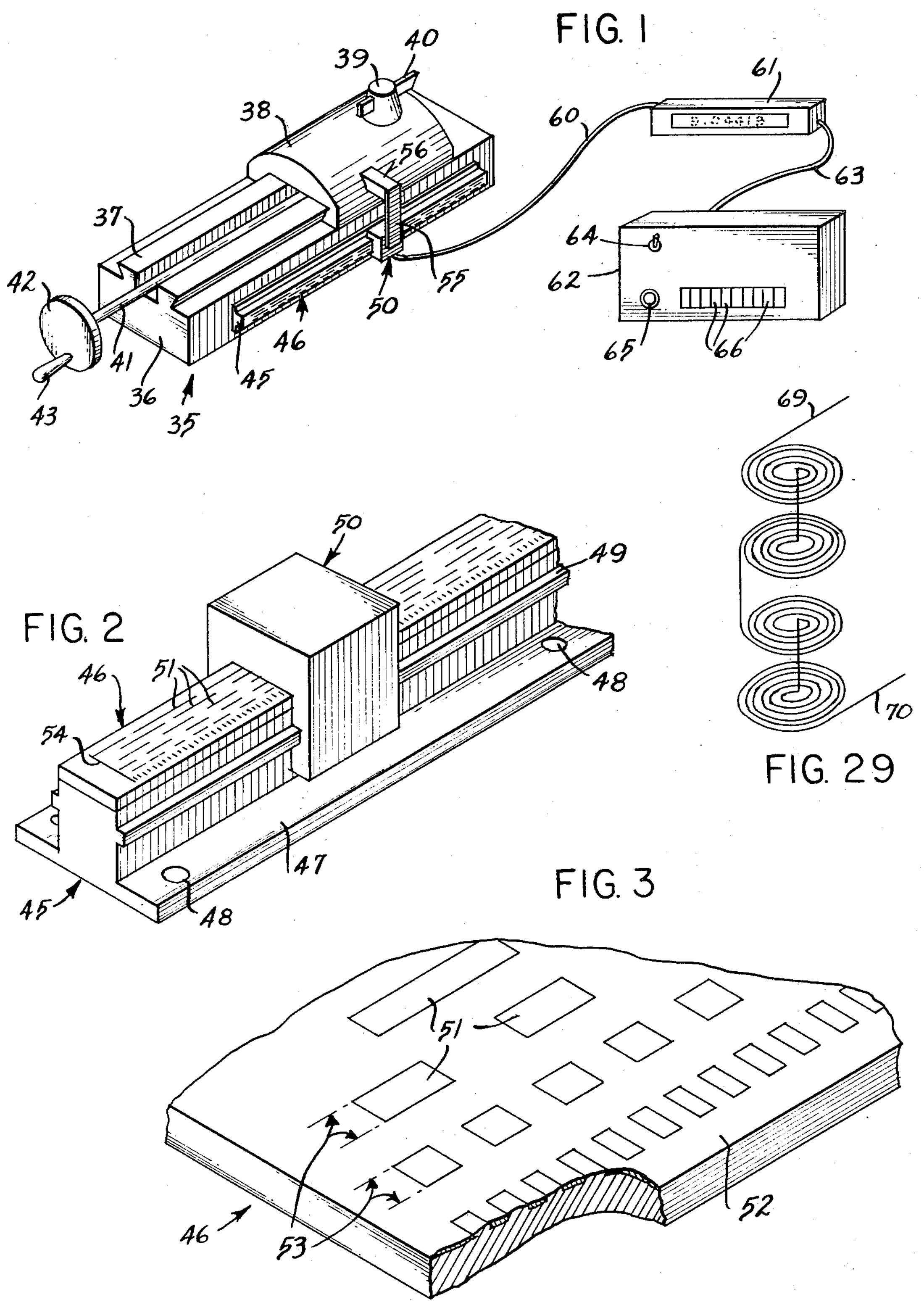
FIG. 1 is a perspective illustrating one application of the invention as applied to the crosshead slide of a machine tool.
FIG. 2 is an enlarged fragmentary perspective of the fixed and movable elements cooperatively associated with each other.
FIG. 3 is an enlarged fragmentary perspective of a coded pattern.
FIG. 29 is a schematic perspective of a modified form of sensor coil.
Figure 4:
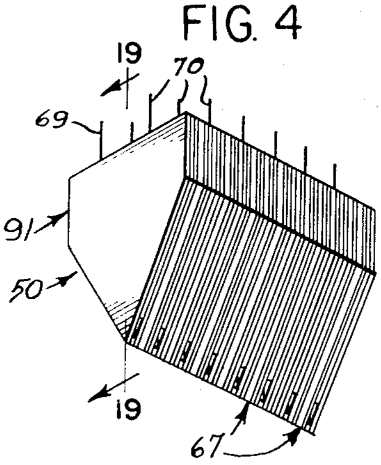
FIG. 4 is a perspective of the pickup head.

With continued reference to the drawings, a machine tool or other mechanical device having relatively movable parts is provided in which it is necessary to know the position of one part relative to the other. As illustrated in FIG. 1, a machine tool such as a lathe cross slide 35 is provided having a fixed base 36 with a dovetail enlargement 37 on which a slide 38 is movably mounted. A tool post 39 is carried by the slide 38 and adjustably receives a tool 40. A conventional lead screw 41, which is rotatably mounted on the base 36, engages the slide 38 so that the rotation of the lead screw causes the slide to move relative to the fixed base with the direction of movement being dependent upon the direction of rotation of the lead screw. A crank wheel 42 is mounted on the end of the lead screw 41 and is provided with an eccentrically mounted operating handle 43 for rotating the wheel and lead screw.

In many numerically controlled machine tools, the crank wheel 42 and the operating handle 43 are replaced by a stepper motor (not shown) which operates in response to electrical signals from a control device and causes the lead screw 41 to be rotated intermittently and advance or retract the slide 38 step by step. It is noted that the structure thus far described is conventional and forms no part of the present invention since any other conventional machine tool or operating mechanism could be utilized as well.

In order to measure the movement of one element relative to another within close tolerances, the present invention includes a support structure 45 having a scale 46 along one surface. The support structure 45 is adapted to be mounted in fixed position on one of the fixed or movable elements in any desired manner, as by outwardly extending flange 47 having mounting holes 48 for the reception of screws or other fasteners. With reference to FIG. 1, the support structure is mounted along one side of the fixed base 36 and parallel with the direction of movement of the slide 38; however, it is noted that the support structure could be attached to the slide 38.

With reference to FIG. 2, the support structure 45 includes guide means or rails 49 on which an eddy current type pickup or read head 50 is slidably mounted. As illustrated best in FIG. 3, the scale includes a coded pattern consisting of sharply defined regions or bits 51 of a highly permeable material such as mu-metal or the like located in a field of low permeability material 52. The bits 51 are arranged in a plurality of rows or channels 53 with such channels being parallel to each other in the direction of travel of the pickup head 50. Each channel has bits of a specific size which are spaced apart a predetermined distance.

The bits 51 of the pattern are arranged so that a line drawn at a predetermined angle across the pattern produces a binary code word of "zeros" and "ones" which is unique to the particular location of the line relative to a fixed reference point 54 located at one end of the pattern. The binary code word is formed on the basis that each of the channels 53 represents one digit and the presence of a bit 51 at the point where the line crosses a particular channel represents a binary one for the digit represented by that channel, while the absence of a bit at the point where the line crosses a particular channel represents a binary zero for the digit represented by that channel.

The bits of the coded pattern can be formed in any desired manner which results in a smooth continuous surface having sharply defined regions of highly permeable material interspersed with regions of material of low permeability. The pattern can be made in any desired manner, as by (1) etching a low carbon steel surface to provide high and low areas and then backfilling the low areas with a low permeability material, such as copper, aluminum, silver or the like, until the upper surface of the low permeability material is substantially flush with the upper surface of the high permeability material (FIG. 3); (2) etching a smooth surface of low permeability material, such as copper, aluminum, silver or the like, and backfilling with a high permeability material, such as low carbon steel, mu-metal or the like; (3) an inert substrate of dimensionally stable thermoplastic or thermosetting material on which a layer of mu-metal foil is laminated and portions of the foil are removed by etching or otherwise so that the sensing head senses the difference between mu-metal and no mu-metal.

In order to move the pickup head 50 relative to the scale 46, such pickup head is connected by an attaching plate 55 to an outwardly extending post 56 which is welded or otherwise connected to the slide 38 to form a substantially rigid connection between the pickup head 50 and the slide 38 at least in the direction of movement parallel to the movement of the slide without lost motion. Elastic compliance of the plate 55 which permits slight movement of the pickup head 50 in a direction normal to the direction of travel of the slide is permissible and in some cases may be desirable as a means to allow for minor tolerance variations in the machine tool assembly along the length of the scale 46.

If the attaching plate 55 and post 56 are sufficiently rigid to maintain the pickup head 50 in close proximity to the scale 34, the guide rails 49 may be omitted from the support structure 45. If this is the case, it is possible to have a position sensing device in which there is no contact between the fixed and movable elements and, therefore, no additional forces or constraints are introduced into the system.

An output signal from the pickup head 50 is transmitted along a cable 60 to a digital readout box 61 having electronic circuitry which provides any necessary power supply conversion, provides binary to decimal conversion circuits enabling a decimal readout to be provided in a numerical display by the use of conventional "nixie" tubes or the like, and provides any addition and subtraction circuits which may be required by the system. A control box 62 located in a position convenient to the operator of the machine tool is connected to the digital readout box 61 by a cable 63. Preferably the control box 62 is equipped with a power switch 64, a system reset button 65, and a plurality of system control switches 66 which provide the operator with means for selecting a numerical quantity which can be transmitted by the cable 63 to the readout box 61.

In order to sense accurately the bits of highly permeable material carried by the scale 46, the pickup head 50 includes a plurality of variable reluctance transducer elements 67 arranged in side-by-side relationship with one transducer element for each channel 53 of the scale. With reference to FIGS. 5–12, each transducer element includes a flat double Flemish coil or double spiral coil 68 of very small diameter wire, such as No. 42 gauge Formvar magnet wire or the like. It is contemplated that the multi-layer coil can be formed in a jig or can be fabricated by printed circuit or vacuum deposition techniques, or in any other desired manner.

Figure 5:
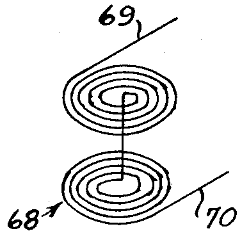
FIG. 5 is a schematic perspective of a two-layer sensor coil.

As illustrated best in FIG. 5, the first layer of the coil is a flat spiral laid down in a counterclockwise direction with the outermost turn terminating in an external lead 69. The second layer is a flat spiral which is laid down in a clockwise direction with the outermost turn terminating in an external lead 70. The center or eye of the coil is left open and the inner ends of the layers are connected together. It is contemplated that the layers of the coil can be constructed from a single length of wire with an integral central connection or the coils can be formed separately, after which the inner ends are connected together. Either construction produces a coil of substantially uniform thickness equal to the sum of two wire diameters plus the thickness of the insulation of both wires and the leads 69 and 70 emerge from opposite sides of the external perimeter of the coil assembly.

As illustrated in FIG. 29, the coil could include more than two layers by merely bending one of the leads 69 or 70 to a different plane and repeating the double spiral arrangement previously described in which each pair of layers are connected together at the center of the coil. The uppermost and the lowermost layers of the coil terminate in outwardly extending leads 69 and 70. In this manner as many layers as desired may be provided in which the two leads are on exterior turns and no leads cross any turns of the spiral coil.

After the layers of the coil have been formed and joined to each other, the layers are bonded together by an insulating coating 71 having a central opening 72 extending through the eye of the coil.

Figure 8:
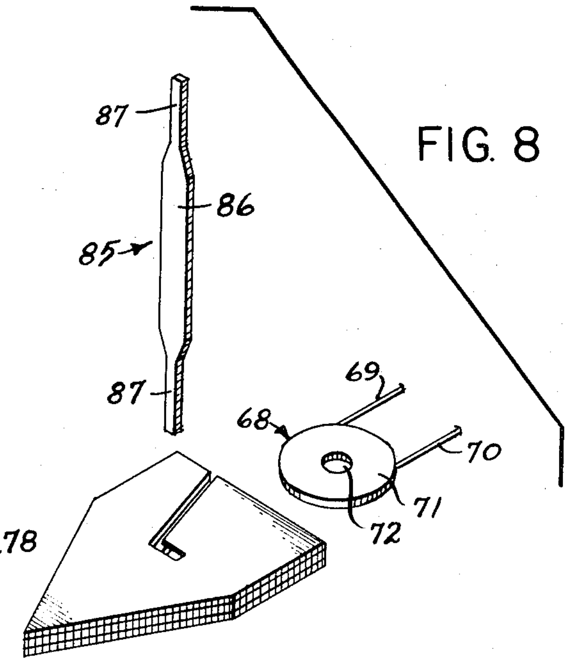
FIG. 8 is an exploded perspective of a coil, shield, and yoke just prior to assembly.
Figure 7:
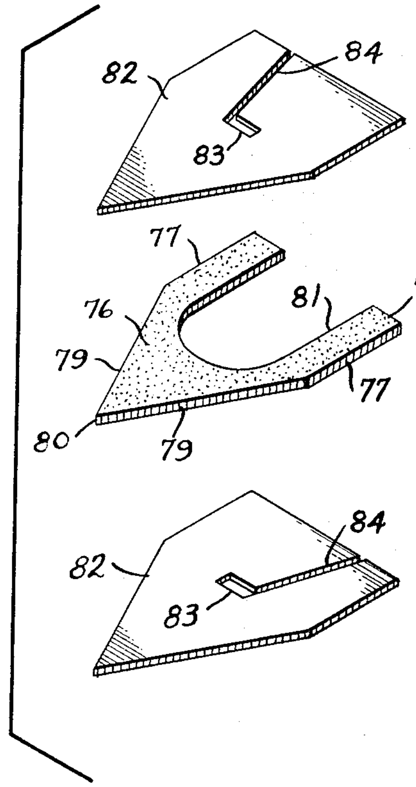
FIG. 7 is an exploded perspective of a coil shield.

With reference to FIGS. 7 and 8, the coil is adapted to be inserted within a shield assembly 75 constructed of low magnetic permeability, high conductivity material such as copper, aluminum, silver or the like. Such shield assembly includes a central member 76 of a thickness substantially equal to the thickness of the coil 68 having a pair of generally parallel side walls 77 which terminate at one end in a rear wall 78 and terminate at the opposite end in angularly disposed front walls 79 which taper inwardly to a sharp point 80. A cutout portion or recess 81 of a size to accommodate the coil 68 extends inwardly from the rear wall 78 to receive such coil. A pair of under-yoke shields 82 of substantially the same external configuration as the central member 76 are bonded to the top and bottom of the central member in any desired manner, as by an electrically conductive material such as solder or the like. Each of the under-yoke shields 82 has a central opening or window 83 and a narrow slot 84 extending from the window 83 to the rear edge of the under-yoke shields. The slots 84 are arranged so that they are open to the recess 81 of the central member 76 and are not covered by any portion of such central member. As illustrated, the slot of the upper under-yoke shield extends from the central window toward one side of the central member recess, and the slot of the lower under-yoke shield extends toward the other side of such recess so that the slots 84 are not in registration with each other. However, it is contemplated that such slots could be in registration if desired. Also, it is noted that the shield assembly 75 could be constructed as an integral unit by electrodeposition or impact extrusion. Additionally, it is contemplated that the central member 76 and one of the under-yoke shields could be formed as an integral unit utilizing chemical milling techniques, after which the other under-yoke shield could be bonded or otherwise attached thereto.

Figure 9:
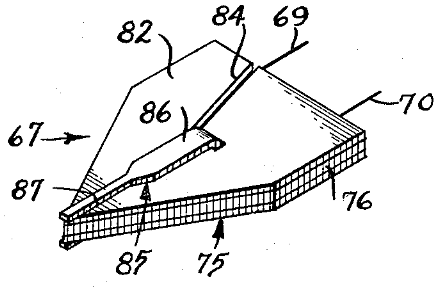
FIG. 9 is a perspective illustrating the assembly of the structure of FIG. 8.
Figure 10:
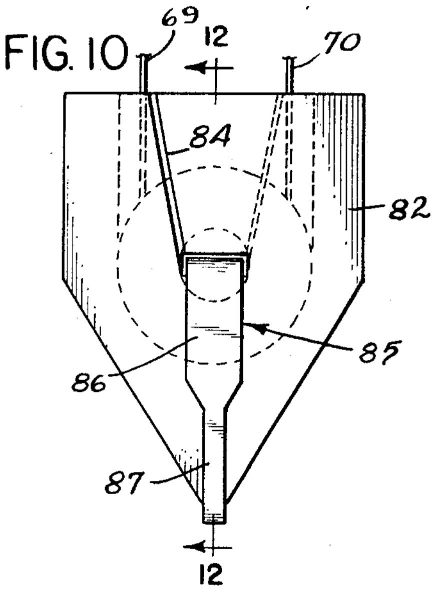
FIG. 10 is a top plan view of the structure of FIG. 9.
Figure 11:
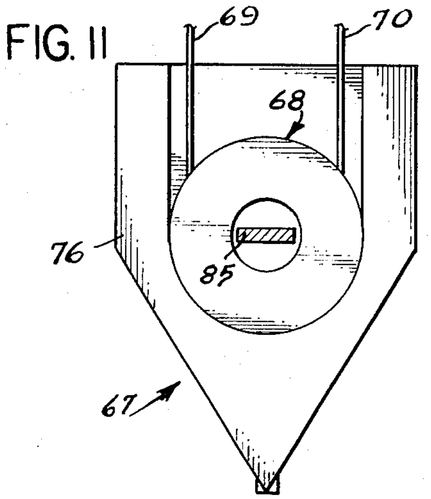
FIG. 11 is a plan view similar to FIG. 10 with the upper portion broken away for clarity.
Figure 12:
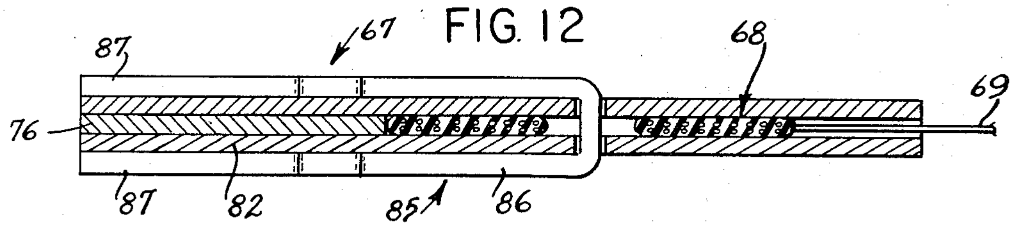
FIG. 12 is an enlarged section on the line 12—12 of FIG. 10.

After the shield assembly 75 has been constructed, the coil 68 is inserted into the recess 81 with the central opening or eye 72 of the coil in alignment with the windows 83 of the under-yoke shields 82. In this position a yoke or core 85 having a wide central portion 86 and reduced end portions 87 is inserted through the windows 83 and the opening 72, after which the opposite ends of the yoke are bent to a position adjacent to the under-yoke shields 82 with the reduced end portions 87 located adjacent to the sharp point 80 of the shield assembly, as illustrated in FIGS. 9 and 10.

Figure 13:
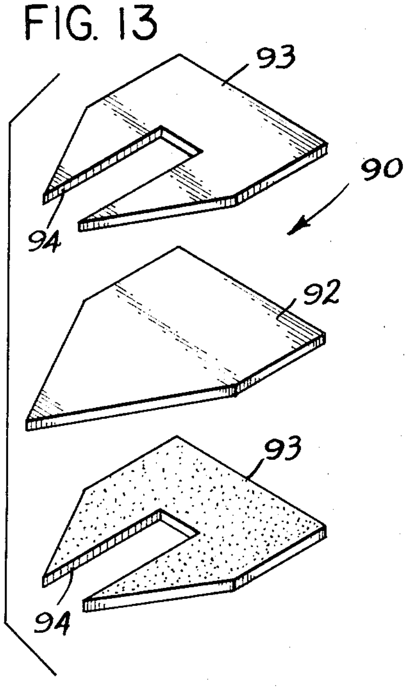
FIG. 13 is an exploded perspective of an intermediate separator for separating channels of the sensor head.
Figure 14:
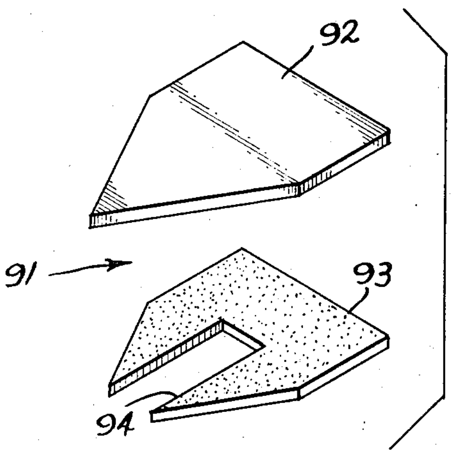
FIG. 14 is an exploded perspective of an end member of the sensor head.
Figure 15:
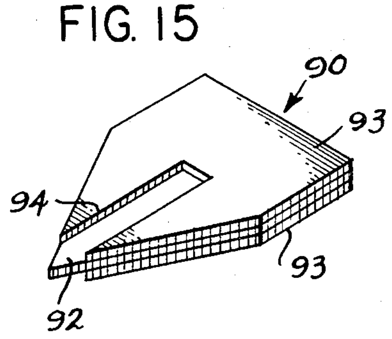
FIG. 15 is a perspective illustrating the structure of FIG. 13 in assembled relation.

With reference to FIGS. 13–20, additional shielding is provided on each side of each of the transducer elements 67 in order to minimize the formation of stray fields in the area exteriorly of the transducer elements 67. This is done by providing a plurality of intermediate shield assemblies 90 and a pair of end shield assemblies 91 located at opposite ends of the pickup head 50. With particular reference to FIGS. 13 and 15, each of the intermediate shield assemblies 90 includes a flat imperforate central member 92 constructed of high conductance low permeability material, such as copper, aluminum, silver, or the like, having a nominal thickness of approximately 0.005 inch. The central member has substantially the same external configuration as the transducer elements 67. A pair of side members 93 are soldered or otherwise attached to the central member 92 and each of such side members has a configuration similar to the central member 92 except that a slot or recess 94 extends inwardly from the front thereof a distance sufficient to accommodate the yoke or core 85 of the transducer elements 67.

Preferably, the side members 93 are of a thickness substantially corresponding to the thickness of the yoke or core 85 of the transducer elements on opposite sides of the intermediate shield assembly. It is noted that the intermediate shield assembly could be made as an integral unit using the same processes as noted above with the shield assembly 75.

Figure 16:
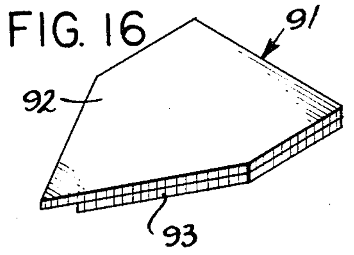
FIG. 16 is a perspective illustrating the structure of FIG. 14 in assembled relation.
Figure 17:
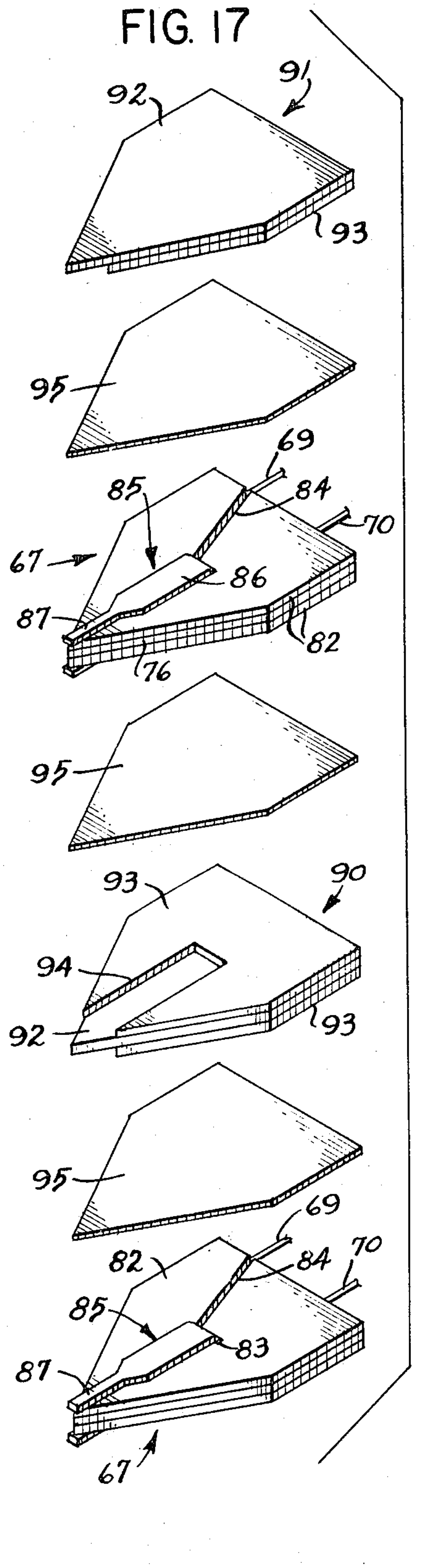
FIG. 17 is an exploded perspective of one end of the pickup head and showing a plurality of sensors.
Figure 18:
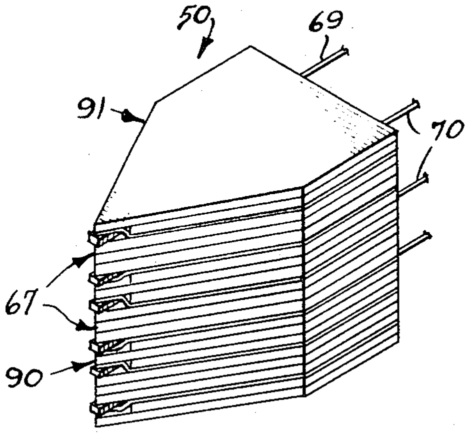
FIG. 18 is a perspective of the structure of FIG. 17 in assembled relation.
Figure 19:
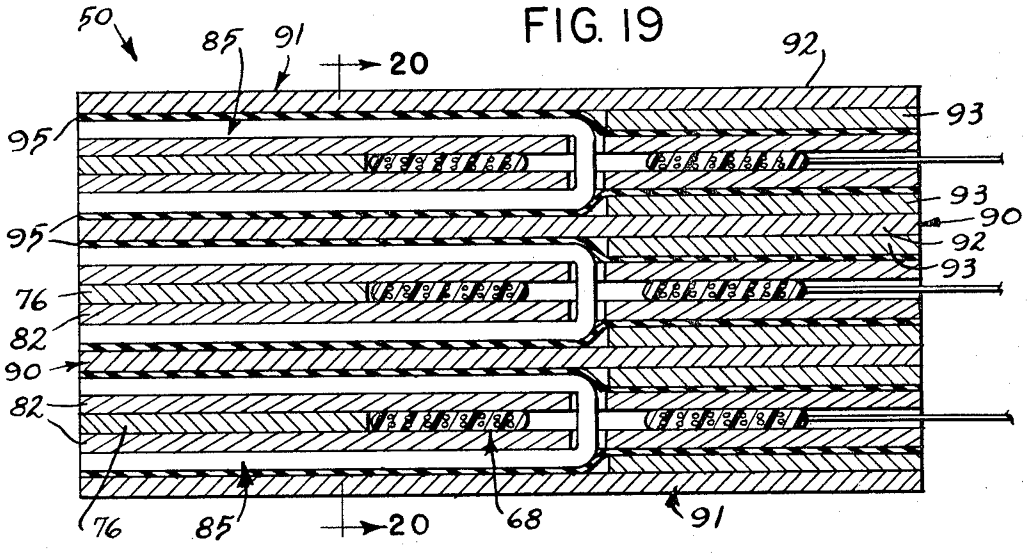
FIG. 19 is an enlarged section on the line 19—19 of FIG. 4.
Figure 20:
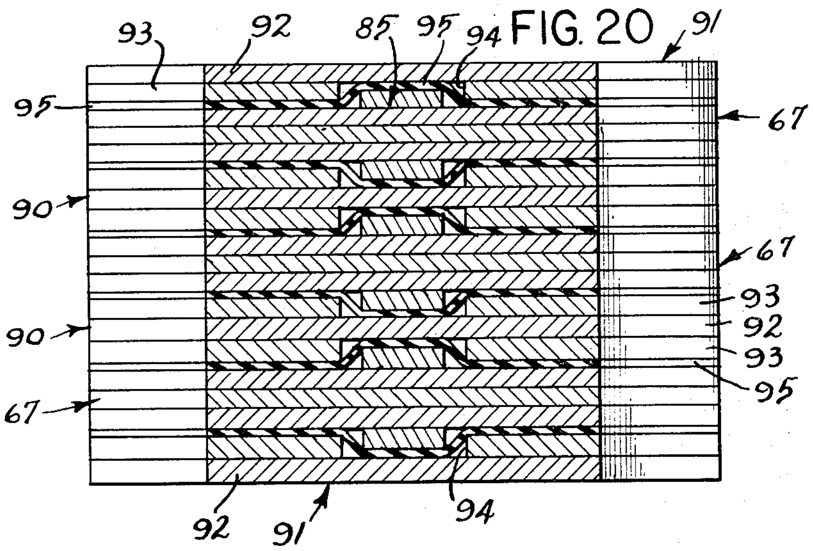
FIG. 20 is a section on the line 20—20 of FIG. 19.

As illustrated in FIGS. 14 and 16, the end shield assemblies 91 are substantially identical to the intermediate shield assemblies 90 with the exception that one of the side members 93 has been omitted in which case the central member 92 will serve as the end of the pickup head 50.

When the pickup head 50 is being assembled, as illustrated in FIGS. 17–20, a variable reluctance transducer element 67 is provided for each channel 53 of the scale 46 and such transducer elements are separated from each other by means of the intermediate shield assemblies 90. A layer of insulation material 95 is applied to each side of the transducer elements 67 to prevent eddy currents from encircling the yoke 85 by flowing across the interfaces between the transducer elements and the shield assemblies 90 and 91. Thereafter, the shield assemblies 90 and 91 are bonded in place using a suitable bonding agent, such as epoxy or the like. After the epoxy has set, the pickup head assembly is machined and polished along the front walls 79 to form a common straight sharply defined edge extending the full length of the pickup head 50.

Figure 21:
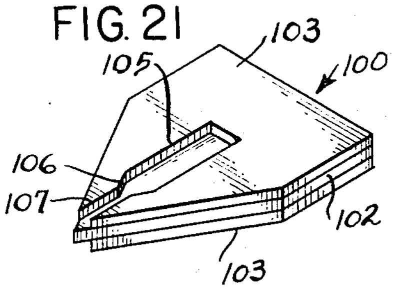
FIG. 21 is a perspective similar to FIG. 15 of a modified intermediate separator.
Figure 22:
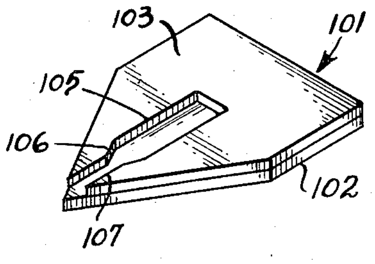
FIG. 22 is a perspective similar to FIG. 16 of a modified form of end member.

With reference to FIGS. 21 and 22, modified forms of an intermediate shield assembly 100 and end shield assembly 101 are provided which are substantially similar to the intermediate and end shield assemblies 90 and 91, respectively, with the exception of the slot or recess 94. In this modification, the intermediate and end shield assemblies 100 and 101 include a central member 102 substantially identical to the central member 92 and having side members 103 mounted thereon in any desired manner, as by solder or other bonding agent. A relatively wide slot 105 is located generally centrally of the side members 103 in a position to receive the wide central portion 86 of the core 85. One end of the wide slot 105 terminates in converging wall portions 106 and such wall portions terminate in a relatively narrow slot 107 of a size to receive the reduced end portions 87 of the core 85.

Figures 23, 24, 25, 26, 27, 28:
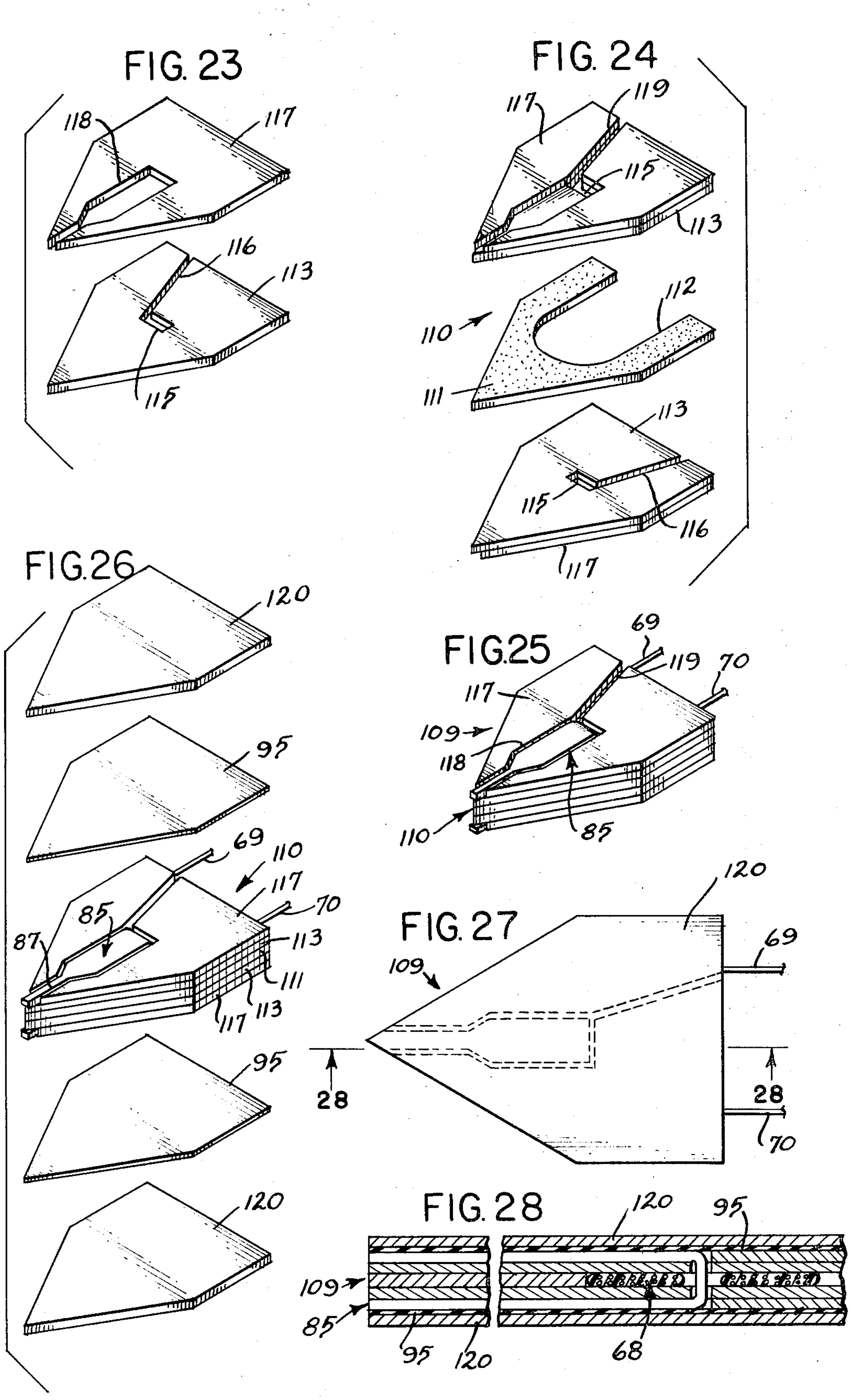
FIG. 23 is an exploded perspective of a modified form of coil shield.
FIG. 24 is an exploded perspective similar to FIG. 7 of a modified form of sensor head.
FIG. 25 is a perspective similar to FIG. 9 of a modified sensor head in assembled relation.
FIG. 26 is an exploded perspective similar to FIG. 17 of one end of a modified pickup head.
FIG. 27 is an enlarged top plan view of the structure of FIG. 26 in assembled relationship.
FIG. 28 is an enlarged fragmentary section on the line 28—28 of FIG. 27.

With reference to FIGS. 23–28, a modified form of transducer element 109 is provided including a shield assembly 110 having a central member 111 with a recess 112 of a size to receive the coil assembly 68. A pair of under-yoke shields 113 are attached by solder or other bonding agent to the top and bottom of the central member 111 in the same manner as previously described with regard to shield assembly 75. Each of the under-yoke shields 113 includes a window 115 and a relatively narrow slot 116 extending from the window to the rear edge of the under-yoke shield. An outer shield 117 is bonded or otherwise attached to the under-yoke shields 113, as illustrated in FIGS. 23 and 24.

The outer shield 117 includes a recess 118 of a size to receive the core 85 of the transducer element. After the outer shield 117 has been attached to the under-yoke shield 113, a relatively narrow slot 119 is provided in the outer shield substantially in alignment with the slot 116 of the corresponding under-yoke shield 113.

In this modification, the core or yoke 85 extends through the central opening of the coil and the windows 115 of the under-yoke shields and is then bent downwardly and received within the recesses 118 of the outer shields 117 on opposite sides of the transducer element 109, as illustrated in FIGS. 25 and 26. Since the outer surfaces of the outer shield 117 and the outer surface of the core 85 are substantially co-planar, relatively flat single thickness end and intermediate shields 120 of high conductance, low permeability material can be used as additional shielding between the transducer elements 109. The shields 120 are similar in construction to the central member 92 previously described with reference to FIGS. 13–20. Relatively flat sheets of insulating material 95 of substantially the same configuration as the transducer elements 109 are provided to separate such transducer elements from the end and intermediate shields 120 when the transducer elements are bonded together in assembled relation to form a pickup head, as shown in FIGS. 26 and 28.

Figure 6:
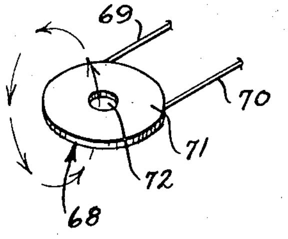
FIG. 6 is a perspective of the coil assembly.

In the operation of the device, when the coil 68 is wound as illustrated in FIG. 5, a current flowing into the coil through lead 69 generates a magnetic field in the coil which has a direction such that it emerges from the center of the coil in an upward direction and thereafter circles downwardly to re-enter the coil from the bottom, as illustrated by the arrows in FIG. 6. The addition of the core or yoke 83, which is fabricated from high permeability material such as mu-metal or the like, causes most of the magnetic field flux to be concentrated in the material of the yoke.

When the coil is energized with direct current, the flux field flows through the core and passes from one reduced end portion 87 through the shield assembly 75 or 110 and enters the other reduced end portion of the core and then back to the center of the coil. There will also be some stray fields in the region surrounding the shield assembly.

When the coil is energized with alternating current, the magnetic field alternates in direction and intensity at the same frequency as the applied energizing current. This alternating field induces eddy currents in the shield assembly 75 or 110 which flow in such directions that secondary magnetic fields are induced within the central member 76 or 111 and the under-yoke shields 82 or 113. Such secondary fields have a direction opposite to the direction of the primary field. The effect of these secondary fields is to tend to exclude the primary field from the central member 76 or 111 and the under-yoke shields 82 or 113 and force the primary field to seek alternate paths outside of the shield assembly 75 or 110. At moderately high frequencies, the field is effectively prevented from leaking back through the shield assembly 75 or 110 between the reduced end portion 87 of the core 85 and is forced to return from one reduced end portion to the other reduced end portion by going out into the region exteriorly of the pickup head 50.

The high permeability yoke which has a large cross-section through most of its length, has a low reluctance and such reluctance is nearly all concentrated in the air gap between the pole tips or reduced end portions 87 of the yoke. The central portion 86 of the yoke or core 85 serves to concentrate the flux emanating from the center of the coil and conduct such flux through the shield windows 83 or 115. The under-yoke shields 82 or 113 prevent the flux from leaking back around the periphery of the coil and, in conjunction with the central member 76 or 111, prevent flux leakage directly through the material between the reduced end portions 87 of the core. The intermediate and end shield assemblies 90 and 91 or 120, respectively, prevent extension of stray fields into the regions surrounding the assembly and thereby increase the concentration of the magnetomotive force gradient or magnetic field energy in the small air gap between the reduced end portions 87. The narrowing of the reduced end portions from the relatively wide central portion of the yoke serves to reduce the effective cross-sectional area of the gap and thereby helps to further concentrate the field.

The volume of the air gap may be considered to be approximately equal to a small slug of air having an area equal to the cross-sectional area of the reduced end portions 87 and a length equal to the distance between the reduced end portions as defined by the total thickness of the shield assembly 75 or 110. If a piece of high permeability material, such as mu-metal or the like, is placed close to the sharp point 80, a major portion of the air gap volume will be replaced by the mu-metal. The effect on the magnetic circuit is to reduce substantially the effective length of the gap and in effect reduce the reluctance of the magnetic circuit. Under these conditions, the net inductance of the device increases.

On the other hand, if a material of low magnetic permeability and high conductivity, such as copper or the like, is placed in the gap instead of the high permeability material, eddy currents are generated in the copper and the fields associated with such eddy currents effectively increase the reluctance of the gap, and the coil circuit inductance of the device decreases. The reason for this effect is that eddy currents are induced in the copper in the air gap and the secondary fields associated with these eddy currents are in opposition to the primary field in the air gap. These changes in inductance can be made large enough to clearly distinguish the presence or absence of high permeability material in the pattern of the scale 46. When the coil is made part of an electrically resonant circuit and is excited with an alternating current source having a frequency such that the device operates on the steep portion of the slope of the resonant curve for the circuit, the above mentioned changes in circuit inductance cause changes in the voltage appearing across the terminals of the resonant circuit.

It is well established that eddy currents induced in a conductive shield, such as the under-yoke shields 82 or 110, tend to concentrate in current flows near the edge of the shield and around any openings or holes in the shield. Thus an under-yoke shield not having slots 84 or 119 would have eddy currents flowing around the window 83 or 115 and the device would behave like a transformer with a short circuited single turn secondary coil. These currents encircling the window 83 or 115 would induce a magnetic field in the volume of the window which would be in opposition to the field induced by the current in the coil 68. The slots 84 or 119 in the under-yoke shields 82 or 113 are provided to interrupt the current flow in the single turn secondary coil so that an opposing magnetic field is not induced in the window 83 or 115 of the under-yoke shields. In order to minimize leakage of magnetic flux through the slots 84 or 119 and the periphery of the coil 68, it is important that such slots are narrow but that no electrically conductive path crosses either slot. In a similar manner, the insulating layer 95 prevents eddy currents from forming a closed circuit around any portion of the length of either leg of the yoke.

We claim:

1. In a digital encoder and position reference, the combination of a scale and a variable reluctance head, said scale including a plurality of channels defining a binary coded pattern which is unique for each position of said head, each channel of said pattern having at least one region of high permeability material and at least one region of low permeability material, said regions of high and low permeability of each channel being different from the regions of adjacent channels, said head comprising a plurality of variable reluctance transducer elements with one element located in alignment with each of said channels, each of said transducer elements including a coil, a yoke having a central portion extending through said coil and having opposite ends located in spaced relationship to each other, first shielding means disposed between portions of said yoke and said coil, second shielding means located between adjacent transducer elements, and means for exciting said coil so that a primary magnetic flux field flows through said yoke and secondary magnetic fields are induced by eddy currents in said first and second shielding means to concentrate the magnetomotive force gradient in the gap between the opposite ends of said yoke to sense the presence or absence of high permeability material in said gap.

2. The structure of claim 1 in which the gap between opposite ends of the yoke of each transducer element is located in alignment with the gaps of the other transducer elements.

3. The structure of claim 1 in which said scale includes sharply defined regions of high permeability and low conductivity material in a field of low permeability and high conductivity material.

4. The structure of claim 1 in which said yoke includes a wide central portion and end portions of reduced size.

5. The structure of claim 1 in which said first shielding means includes an opening to accommodate said yoke, and a slot extending from said opening to the edge of said first shielding means in the area of said coil to interrupt current flow through said first shielding means.

6. The structure of claim 1 in which said region of high permeability material in said scale is constructed of mu-metal.

7. The structure of claim 1 in which said region of high permeability material in said scale is constructed of low carbon steel.

8. The structure of claim 1 in which said region of low permeability material in said scale is constructed of copper.

9. The structure of claim 1 in which said coil includes multi-layers in which each pair of layers are connected together at the center of the coil.

10. A digital encoder and position reference apparatus for measuring precise distances from a known reference point comprising a scale having a plurality of channels defining a binary coded pattern, one of said channels having at least one region of high permeability material, each of the other channels having regions of high permeability material equally spaced in regions of low permeability material, said regions of high and low permeability of each channel being different from the regions of adjacent channels, a variable reluctance head mounted in proximity to said scale, one of said head and said scale being movable relative to the other, said head including a plurality of variable reluctance transducer elements with one element in alignment with each of the channels of said scale, each of said transducer elements including a multi-layer coil connected together at the center of the coil and having outwardly extending peripheral leads, first shielding means located about said coil, a substantially U-shaped yoke having a bight portion extending through said first shielding means and the center of said coil, said yoke having generally parallel arms located adjacent to said first shielding means and terminating in spaced relationship to each other at one edge thereof and defining a gap, second shielding means located between adjacent transducer elements, and means for applying alternating current to the leads of said coil so that a primary magnetic flux field flows through said yoke and a secondary magnetic field is induced by eddy currents in said first and second shielding means and cause the magnetomotive force gradient to be concentrated in the gap between the opposite ends of said yoke to sense the presence or absence of high permeability material in said gap.

11. In a digital encoder and position reference apparatus having a scale including a binary coded pattern consisting of a plurality of channels, each channel having at least one region of high permeability material and at least one region of low permeability material, said regions of high and low permeability of said channels cooperating to define a predetermined number of unique positions; the improvement comprising a pickup head, said head including a plurality of variable reluctance transducer elements with one element located adjacent to each of the channels of said scale, each of said transducer elements including a coil, a yoke having a central portion associated with said coil and having opposite ends located in spaced relationship to each other, first shielding means located between the opposite ends of said yoke, second shielding means located on the opposite side of said yoke from said first shielding means, and means for exciting said coil so that a primary magnetic flux field flows through said yoke and secondary magnetic fields are induced by eddy currents in said first and second shielding means to concentrate the magnetomotive force gradient in the gap between opposite ends of said yoke to sense the presence or absence of high permeability material in said gap.

* * * * *